(12) United States Patent
De Hoog et al.

(10) Patent No.: US 7,433,256 B2
(45) Date of Patent: Oct. 7, 2008

(54) INFORMATION CARRIER, AND SYSTEM FOR POSITIONING SUCH AN INFORMATION CARRIER IN A READING AND/OR WRITING APPARATUS

(75) Inventors: Thomas Jan De Hoog, Eindhoven (NL); Robert Frans Maria Hendriks, Eindhoven (NL); Aukje Arianne Annette Kastelijn, Eindhoven (NL); Peter Van Der Walle, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 157 days.

(21) Appl. No.: 11/568,243

(22) PCT Filed: Apr. 21, 2005

(86) PCT No.: PCT/IB2005/051306
§ 371 (c)(1),
(2), (4) Date: Oct. 24, 2006

(87) PCT Pub. No.: WO2005/106857
PCT Pub. Date: Nov. 10, 2005

(65) Prior Publication Data
US 2007/0220538 A1    Sep. 20, 2007

(30) Foreign Application Priority Data
Apr. 28, 2004    (EP) .................................. 04300240

(51) Int. Cl.
*G11C 7/00*    (2006.01)
(52) U.S. Cl. ........................... 365/215; 365/63; 365/64; 356/401; 356/605; 356/618; 358/533; 235/454; 235/470

(58) Field of Classification Search ............... 365/64, 365/215, 63; 720/745; 356/401, 605, 618; 250/548, 237 G; 235/454, 470; 358/533
See application file for complete search history.

(56) References Cited

U.S. PATENT DOCUMENTS

| 4,664,524 | A |   | 5/1987 | Hattori et al. |
| 4,774,400 | A |   | 9/1988 | Kimura |
| 4,908,656 | A | * | 3/1990 | Suwa et al. .................... 355/53 |
| 5,075,562 | A | * | 12/1991 | Greivenkamp et al. . 250/559.05 |
| 5,307,152 | A | * | 4/1994 | Boehnlein et al. ........... 356/605 |

FOREIGN PATENT DOCUMENTS

EP    0965889 A2    12/1999

OTHER PUBLICATIONS

Written Opinion of the International Searching Authority PCT/IB2005/051306.

* cited by examiner

*Primary Examiner*—Richard T. Elms
*Assistant Examiner*—Eric Wendler
(74) *Attorney, Agent, or Firm*—Michael E. Belk

(57) ABSTRACT

The invention relates to an information carrier (101) intended to be read and/or written by a periodic array of light spots, said information carrier (101) comprising a data area (105) defined by a set of elementary data areas, a first periodic structure (108) intended to interfere with said periodic array of light spots for generating a first moiré pattern, a second periodic structure (109) intended to interfere with said periodic array of light spots for generating a second moiré pattern, said second periodic structure (109) being arranged perpendicularly to said first periodic structure (108). The invention also relates to an apparatus for reading and/or writing said information carrier (101).

13 Claims, 20 Drawing Sheets

A

B

C

D

INFORMATION CARRIER, AND SYSTEM FOR POSITIONING SUCH AN INFORMATION CARRIER IN A READING AND/OR WRITING APPARATUS

FIELD OF THE INVENTION

The invention relates to a system for positioning an information carrier in a reading and/or writing apparatus.

The invention also relates to said information carrier.

The invention has applications in the field of optical data storage.

BACKGROUND OF THE INVENTION

The use of optical storage solutions is nowadays widespread for content distribution, for example in storage systems based on the DVD (Digital Versatile Disc) standards. Optical storage has a big advantage over hard-disk and solid-state storage in that the information carriers are easy and cheap to replicate.

However, due to the large amount of moving elements in the drives, known applications using optical storage solutions are not robust to shocks when performing read/write operations, considering the required stability of said moving elements during such operations. As a consequence, optical storage solutions cannot easily and efficiently be used in applications which are subject to shocks, such as in portable devices.

New optical storage solutions have thus been developed. These solutions combine the advantages of optical storage in that a cheap and removable information carrier is used, and the advantages of solid-state storage in that the information carrier is still and that its reading requires a limited number of moving elements.

OBJECT AND SUMMARY OF THE INVENTION

It is an object of the invention to propose a system for accurately positioning an information carrier with respect to an array of light spots in a reading and/or writing apparatus.

The system according to the invention comprises:
  an optical element for generating a periodic array of light spots intended to be applied to an information carrier,
    said information carrier comprising a first periodic structure being intended to interfere with said periodic array of light spots for generating a first moiré pattern, and a second periodic structure being intended to interfere with said periodic array of light spots for generating a second moiré pattern, said second periodic structure being placed perpendicularly to said first periodic structure,
  first analysis means for deriving from said first and second moiré patterns, the spatial position between said periodic array of light spots and said information carrier,
  first actuation means for adjusting the spatial position of said information carrier with respect to said array of light spots, based on control signals derived from said spatial position.

The array of light spots is applied to the information carrier for reading the data stored on a data area. The information carrier corresponds to a matrix of transparent or non-transparent elementary data areas; the array of light spots is regular and defines a periodic grid. According to the state of transparency of the elementary data areas, the light spots are transmitted or not to a detector intended to convert the received light signals into multilevel data (e.g. binary, ternary . . . ).

The information carrier comprises periodic structures placed on two sides of the data area. When the array of light spots interferes with these periodic structures, moiré patterns are generated and detected. In analysing the moiré Patterns, it becomes possible to accurately measure the spatial position of the information carrier compared to the position of the array of light spots, because a small shift between the array of light spots and the information carrier results in a large shift of the moiré Patterns. Control signals reflecting the spatial position can thus be derived from the moiré Patterns, and used as input signals for actuation means intended to adjust the spatial position of the information carrier with respect to the array of light spots. The light spots can thus accurately be positioned in front of the elementary data areas, resulting in a reading of the information carrier with a low error rate.

The invention also relates to an information carrier intended to be read and/or written by a periodic array of light spots, said information carrier comprising:
  a data area defined by a set of elementary data areas,
  a first periodic structure intended to interfere with said periodic array of light spots for generating a first moiré pattern,
  a second periodic structure intended to interfere with said periodic array of light spots for generating a second moiré pattern, said second periodic structure being arranged perpendicularly to said first periodic structure.

Each moiré pattern generated by the periodic structures is used to derive the spatial position of the information carrier compared to the position of the array of light spots.

Moiré patterns may be obtained by printing, gluing of a structure, leading to a cost-effective solution suitable for content distribution.

Detailed explanations and other aspects of the invention will be given below.

BRIEF DESCRIPTION OF THE DRAWINGS

The particular aspects of the invention will now be explained with reference to the embodiments described hereinafter and considered in connection with the accompanying drawings, in which identical parts or sub-steps are designated in the same manner.

DETAILED DESCRIPTION OF THE INVENTION

Figure 1:
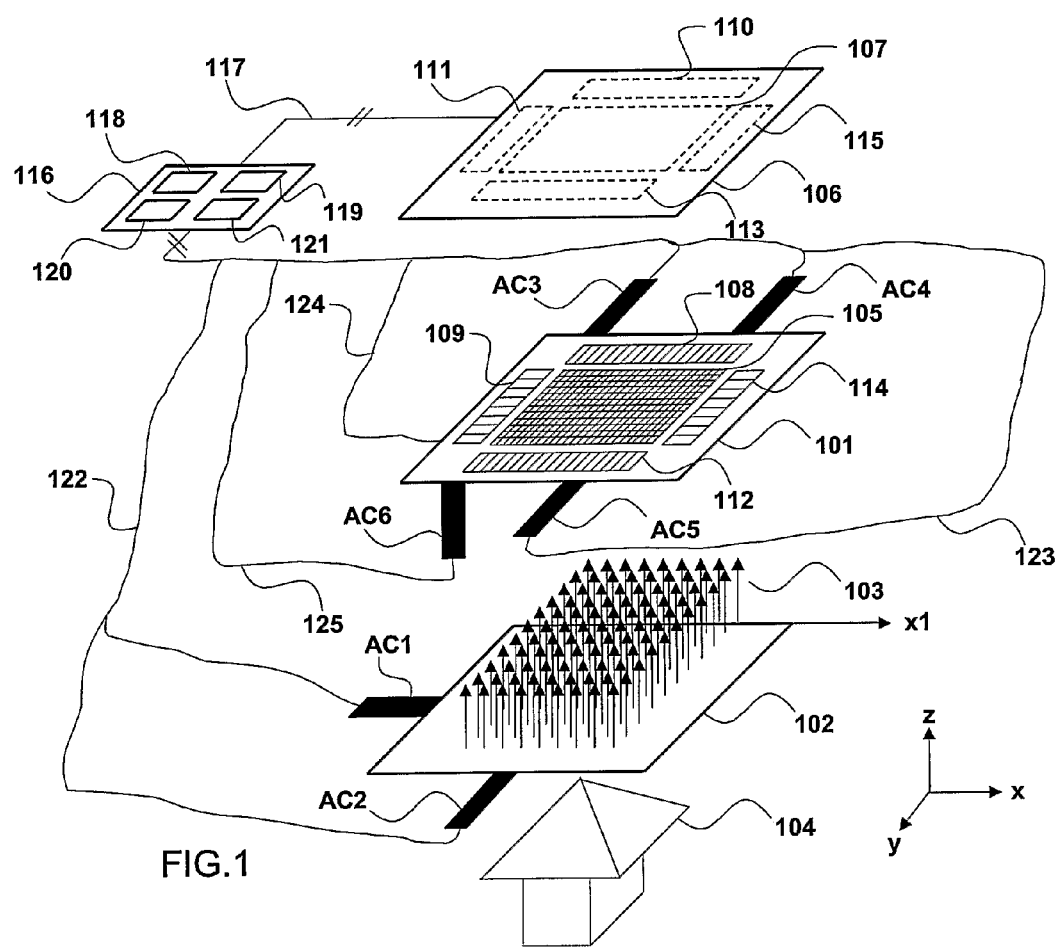
FIG. 1 depicts a system according to the invention.

FIG. 1 depicts a three-dimensional view of the system according to the invention aimed at generating control signals reflecting the spatial position of an information carrier 101 in a reading apparatus, and at adjusting said spatial position based on said control signals.

The system comprises an optical element 102 for generating a periodic array of light spots 103 intended to be scanned and applied to the information carrier 101. The scanning is performed in moving the array of light spots over the information carrier. An input light beam 104 is applied to the input of the optical element 102. The input light beam 104 can be realized by a waveguide (not represented) for expanding an input laser beam, or by a two-dimensional array of coupled micro lasers.

Figure 2:
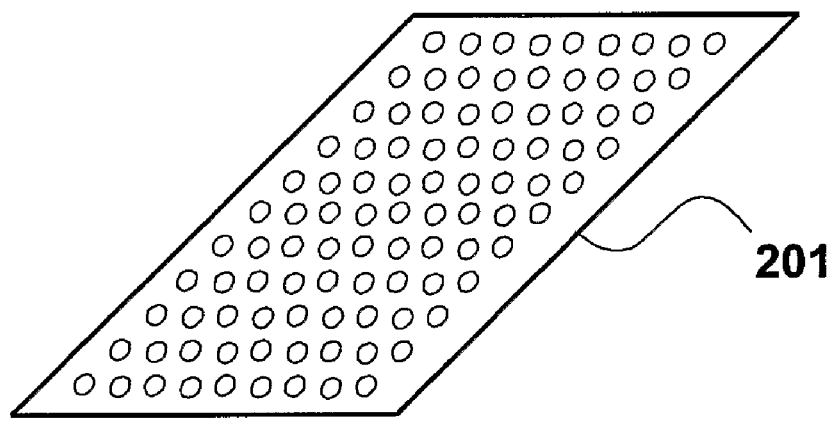
FIG. 2 depicts a first optical element according to the invention.

According to a first embodiment depicted in FIG. 2, the optical element 102 corresponds to a two-dimensional array 201 of micro-lenses to the input of which the coherent input light beam 104 is applied. The array of micro-lenses is placed parallel and distant from the information carrier 101 so as to focus the light spots on the surface of the information carrier 101. The numerical aperture and quality of the micro-lenses determines the size of the light spots. For example, a two-dimensional array of micro-lenses having a numerical aperture which equals 0.3 may be used.

Figure 3:
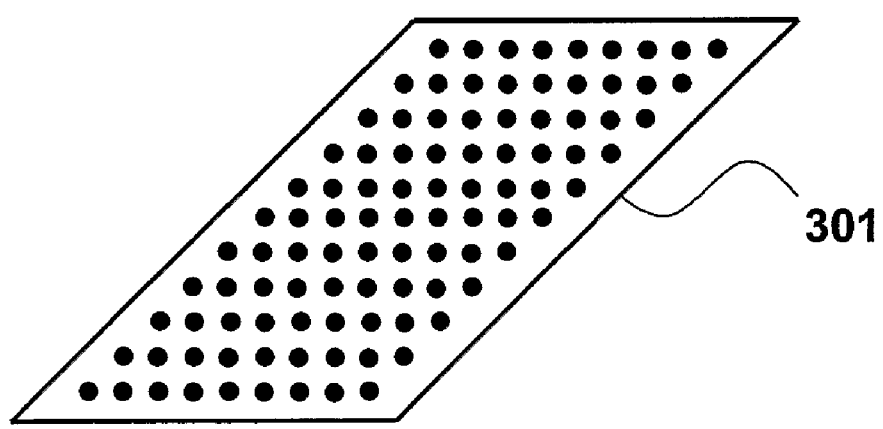
FIG. 3 depicts a second optical element according to the invention.

According to a second embodiment depicted in FIG. 3, the optical element 102 corresponds to a two-dimensional array of apertures 301 to the input of which the coherent input light beam 104 is applied. The apertures correspond for example to circular holes having a diameter of 1 µm or much smaller.

In this second embodiment, the array of light spots 103 is generated by the array of apertures in exploiting the Talbot effect which is a diffraction phenomenon working as follow. When a number of coherent light emitters of the same wavelength, such as the input light beam 104, are applied to an object having a periodic diffractive structure, such as the array of apertures, the diffracted lights recombines into identical images of the emitters at a plane located at a predictable distance z0 from the diffracting structure. This distance z0, at which the information carrier 101 is placed, is known as the Talbot distance. The Talbot distance z0 is given by the relation $z0=2.n.d^2/\lambda$, where d is the periodic spacing of the light emitters, $\lambda$ is the wavelength of the input light beam, and n is the refractive index of the propagation space. More generally, re-imaging takes place at other distances z(m) spaced farther from the emitters and which are a multiple of the Talbot distance z such that $z(m)=2.n.m.d^2/\lambda$, where m is an integer. Such re-imaging also takes place for m=½+ an integer, but here the image is shifted over half a period. The re-imaging also takes place for m=¼+ an integer, and for m=¾+ an integer, but the image has a doubled frequency which means that the period of the light spots is halved with respect to that of the array of apertures.

Exploiting the Talbot effect allows generating an array of light spots of high quality at a relatively large distance from the array of apertures (a few hundred µm, expressed by z(m)), without the need for optical lenses. This allows inserting for example a cover layer between the array of aperture and the information carrier for preventing the latter from contamination (e.g. dust, finger prints . . . ). Moreover, this facilitates the implementation and allows increasing the density of light spots in a cost-effective manner compared to the use of an array of micro-lenses, which light spots are applied to the information carrier.

Coming back to FIG. 1, the information carrier 101 comprises a data area 105 intended to store data coded on a multilevel, for example binary or ternary level. The data area 105 comprises adjacent elementary data areas organized as in a matrix. The elementary data areas are for example represented as adjacent squares. The states of binary data stored on the elementary data areas 105 are for example represented by transparent, or non-transparent areas (i.e. light-absorbing). The elementary data areas are printed on a material such as glass or plastic.

The light spots are applied on the elementary data areas of the information carrier 101. If a light spot is applied on a non-transparent elementary data area, no output light beam passes through the information carrier. On the contrary, if a light spot is applied on a transparent elementary data area, it passes through the information carrier and can be detected afterwards by a detector 106 placed above the information carrier 101.

Each light spot is applied and scanned over a partial area of the data area 105. The scanning of the information carrier 101 is performed in displacing the array of light spots 103 along the x and y axis.

The detector 106 is notably used for detecting the binary value of the elementary data areas on which the optical spots are applied. To this end, the detector 106 comprises a data detection area 107 opposite the data area 105 of the information carrier, in parallel planes. The detector 106 is for example made of an array of CMOS or CCD pixels. Advantageously, one pixel of the detector is intended to detect a set of elementary data, each data among this set of elementary data being successively read by a single light spot. This way of reading data on the information carrier 101 is called macro-cell scanning in the following and will be described hereinafter.

Figure 4:
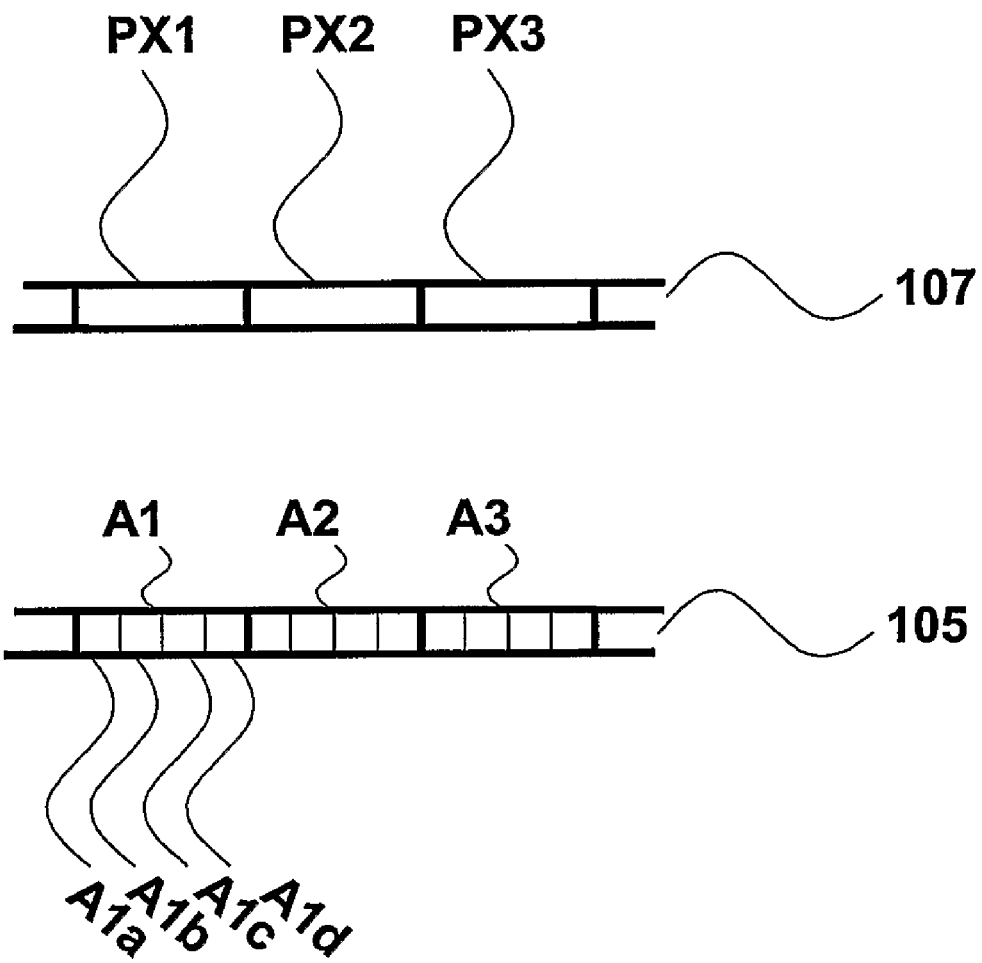
FIG. 4 depicts a detailed view of the system according to the invention.

FIG. 4 depicts a cross-section and detailed view of the data area 105 of the information carrier 101, and the data detection area 107 of the detector 106. The detector 106 comprises pixels referred to as PX1-PX2-PX3, the number of pixels shown being limited for facilitating the understanding. In particular, pixel PX1 is intended to detect data stored on the data area A1 of the information carrier, pixel PX2 is intended to detect data stored on the data area A2, and pixel PX3 is intended to detect data stored on the data area A3. Each data area, also called macro-cell, comprises a set of elementary data. For example, data area A1 comprises four elementary data referred to as A1a-A1b-A1c-A1d.

Figure 5:
FIG. 5 illustrates the principle of macro-cell scanning according to the invention.
Figure 5:
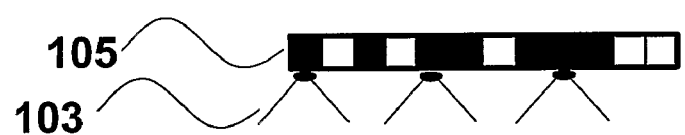
Figure 5:
Figure 5:
Figure 5:
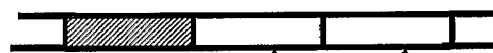
Figure 5:
Figure 5:
Figure 5:
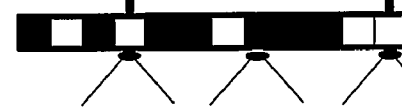

FIG. 5 illustrates by an example the macro-cell scanning of an information carrier 101. Data stored on the information carrier have two states indicated either by a black area (i.e. non-transparent) or white area (i.e. transparent). For example, a black area corresponds to a "0" binary state, whereas a white area corresponds to a "1" binary state. When a pixel of the detector is illuminated by an output light beam generated by the information carrier 101, the pixel is represented by a white area. In that case, the pixel delivers an electric output signal (not represented) having a first state. On the contrary, when a pixel of the detection area 107 does not receive any output light beam from the information carrier, the pixel is represented by a shaded area. In that case, the pixel delivers an electric output signal (not represented) having a second state.

In this example, each set of data comprises four elementary data, and a single light spot is applied simultaneously to each set of data. The scanning of the information carrier 101 by the array of light spots 103 is performed for example from left to right, with an incremental lateral displacement which equals the distance S between two elementary data.

In position A, all the light spots are applied to non-transparent areas so that all pixels of the detector are in the second state.

In position B, after displacement of the light spots to the right, the light spot to the left side is applied to a transparent area so that the corresponding pixel is in the first state, while the two other light spots are applied to non-transparent areas so that the two corresponding pixels of the detector are in the second state.

In position C, after displacement of the light spots to the right, the light spot to the left side is applied to a non-transparent area so that the corresponding pixel is in the second state, while the two other light spots are applied to transparent areas so that the two corresponding pixels of the detector are in the first state.

In position D, after displacement of the light spots to the right, the central light spot is applied to a non-transparent area so that the corresponding pixel is in the second state, while the two other light spots are applied to transparent areas so that the two corresponding pixels of the detector are in the first state.

The scanning of the information carrier 101 is complete when the light spots have been applied to all data of a set of data facing a pixel of the detector. It implies a two-dimensional scanning of the information carrier. Elementary data which form a set of data opposite a pixel of the detector are read successively by a single light spot.

The scanning of the information carrier by the array of light spots 103 is done in a plane defined by axes x and y, parallel to the information carrier 101. A scanning device provides translational movement in the two directions x and y for scanning all the surface of the information carrier.

Figure 6:
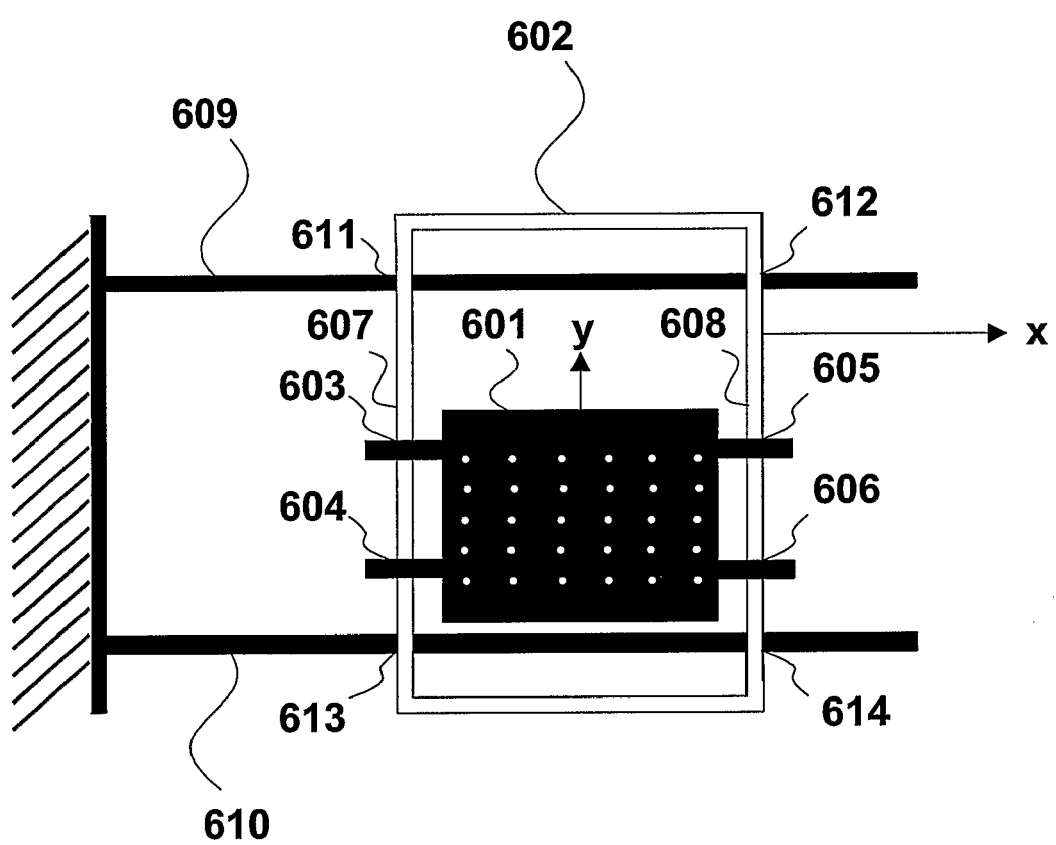
FIG. 6 depicts the scanning of an information carrier according to the invention.

According to a first solution depicted in FIG. 6, the scanning device corresponds to an H-bridge. The optical element 102 generating the array of light spots (i.e. the array of microlenses or the array of apertures) is implemented in a first sledge 601 which is movable along the y axis compared to a second sledge 602 movable along the x axis. To this end, the first sledge 601 comprises joints 603-604-605-606 in contact with guides 607-608. The second sledge 602 is movable along the x axis by means of joints 611-612-613-614 in contact with guides 609-610. The sledges 601 and 602 are translated by means of actuators (not represented), such as by stepper motors, magnetic or piezoelectric actuators acting as jacks.

Figure 7:
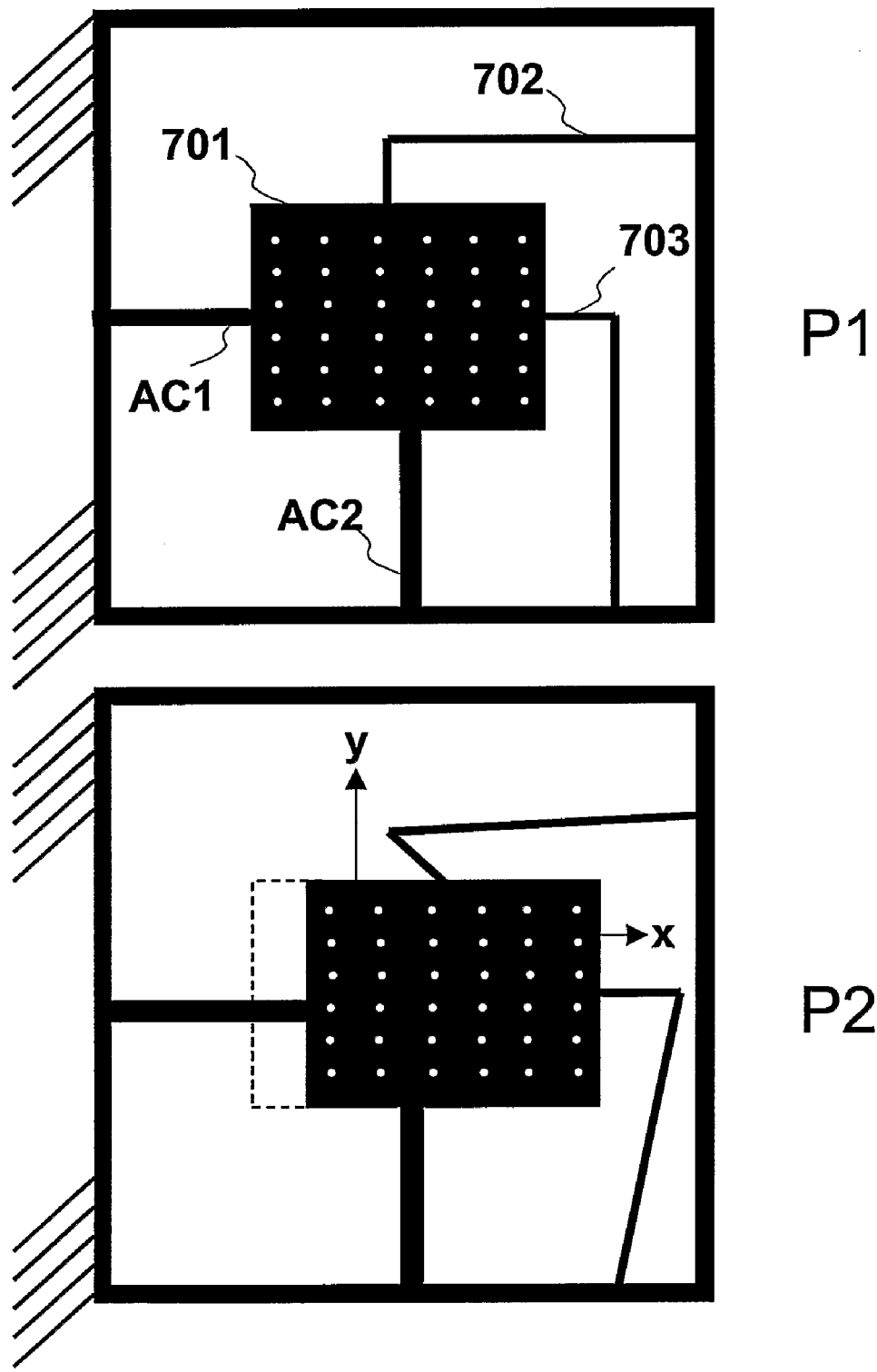
FIG. 7 illustrates by multiple views the scanning of an information carrier according to the invention.
Figure 8:
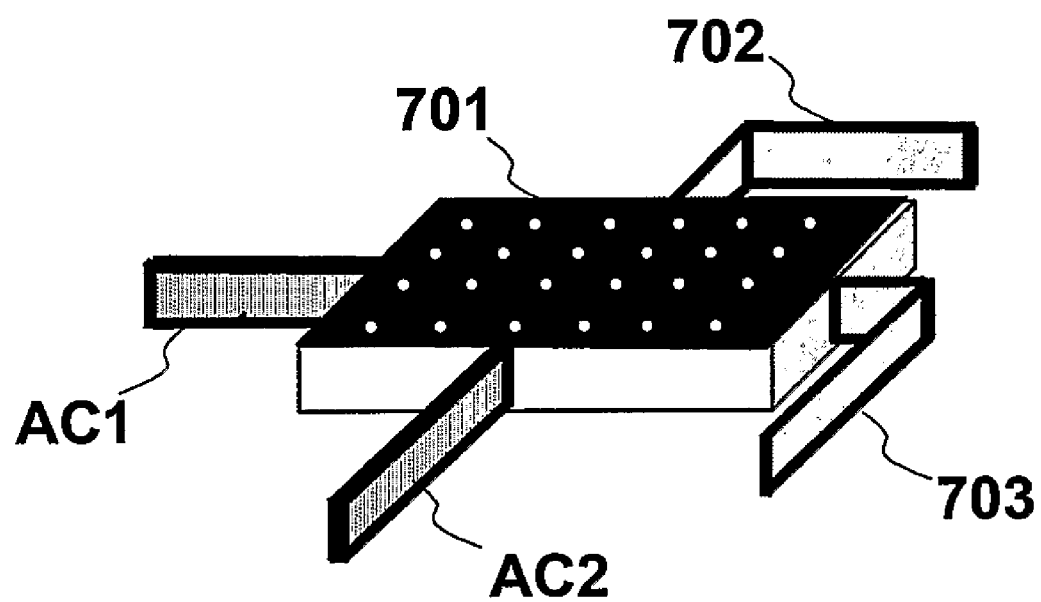
FIG. 8 depicts a detailed element of the scanning according to the invention.

According to a second solution depicted in FIG. 7, the scanning device is maintained in a frame 701. The elements used for suspending the frame 701 are depicted in a detailed three-dimensional view in FIG. 8. These elements comprise:

a first leaf spring 702, a second leaf spring 703, a first piezoelectric element AC1 providing the actuation of the scanning device 701 along the x axis, a second piezoelectric element AC2 providing the actuation of the scanning device 701 along the y axis.

The second solution depicted in FIG. 7 has less mechanical transmissions than the H-bridge solution depicted in FIG. 6. The piezoelectric elements, in contact with the frame 701, are electrically controlled (not represented) so that a voltage variation results in a dimension change of the piezoelectric elements, leading to a displacement of the frame 701 along the x and/or y axis.

The position P1 depicts the scanning device 701 in a first position, while the position P2 depicts the scanning device 701 in a second position after translation along the x axis. This figure illustrates the flexibility of the leaf springs 702 and 703.

A similar configuration can be built with four piezoelectric elements, the two extra piezoelectric elements replacing the leaf springs 702 and 703. In that case, opposite pair of piezoelectric elements act together in one dimension in the same way as an antagonistic pair of muscles.

The information carrier 101 also comprises a first periodic structure 108, and a second periodic structure 109. The first and second periodic structures are for example printed or glued on the information carrier. The periodic structures 108 and 109 are composed of transparent and non-transparent parallel stripes.

The first periodic structure 108 is intended to interfere with the periodic array of light spots 103 for generating a first moiré pattern on an area 110 of the detector 106. The first moiré pattern is only generated by the subset of light spots taken from the periodic array of light spots 103 which is opposite the first periodic structure 108. The first periodic structure 108 and the area 110 are each other's opposites.

The second periodic structure 109 is intended to interfere with the periodic array of light spots 103 for generating a second moiré pattern on an area 111 of the detector 106. The second moiré pattern is only generated by the subset of light spots taken from the periodic array of light spots 103 which is opposite the second periodic structure 109. The second periodic structure 109 and the area 111 are each other's opposites.

Figure 9:
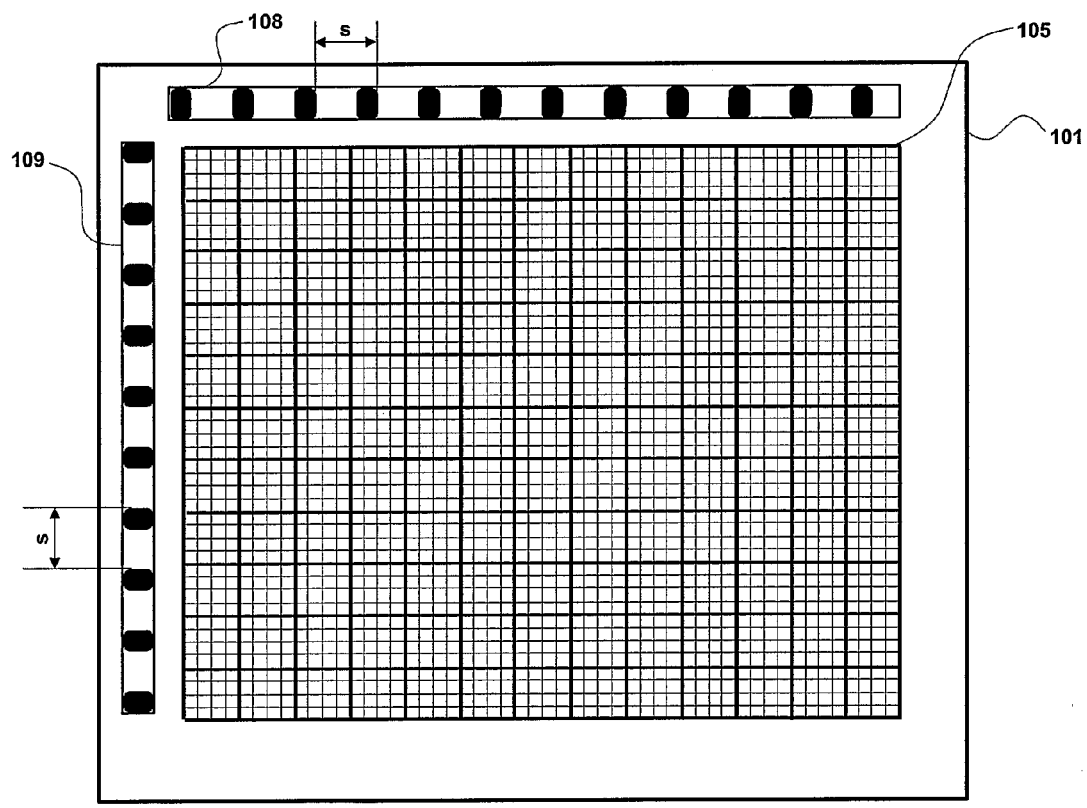
FIG. 9 depicts a first information carrier according to the invention.

FIG. 9 depicts a top-view of an information carrier 101 comprising a first periodic structure 108 and a second periodic structure 109 placed perpendicularly to it. Each periodic structure is made of parallel stripes having a period referred to as "s" (it is noted that the period of the first periodic structure 108 and the period of the second periodic structure 109 could also be different). The data area 105 is made of adjacent macro-cells (squares in bold lines), each macro-cell comprising a set of elementary data areas (sixteen elementary data areas are represented in this example). Each macro-cell is intended to be scanned by one light spot.

The moiré effect is an optical phenomenon which occurs when an input image with a structure having a period s (i.e. the periodic structure 108 or 109 in the present case) is sampled with a periodic sampling grid having a period p (i.e. the periodic array of light spots 103 in the present case) which is close or equal to the period s of the input image, which results in aliasing. The sampled image (i.e. the moiré pattern) is magnified and rotated compared to the input image.

It can be shown that the magnification factor $\mu$ of the moiré pattern, and the angle $\phi$ between the moiré pattern and the periodic structure are expressed as follows $$\mu = \frac{p}{\sqrt{(p\cos\theta - s)^2 + (p\sin\theta)^2}} \quad (1)$$

$$\tan\phi = \frac{p\sin\theta}{p\cos\theta - s} \quad (2)$$

where p is the period of the array of light spots 103,
s is the period of the periodic structure 108 or 109,
θ is the angle between the periodic array of light spots 103 and the period structure.

For a situation without angular misalignment between the array of light spots 103 and the periodic structure 108 or 109 (i.e. with an angle θ=0), the magnification factor μ0 is expressed as follows:

$$\mu0 = \frac{p}{|p - s|} \quad (3)$$

Figure 10:
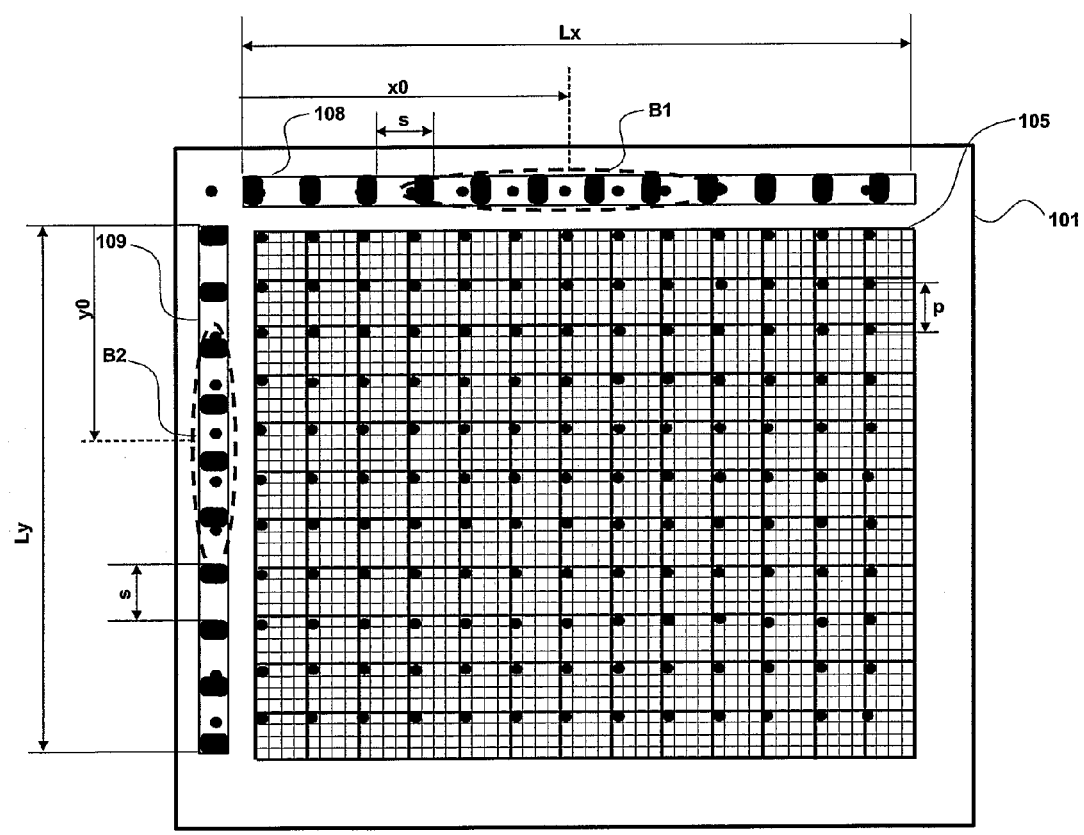
FIG. 10 illustrates by a first example said first information carrier according to the invention.
Figure 11:
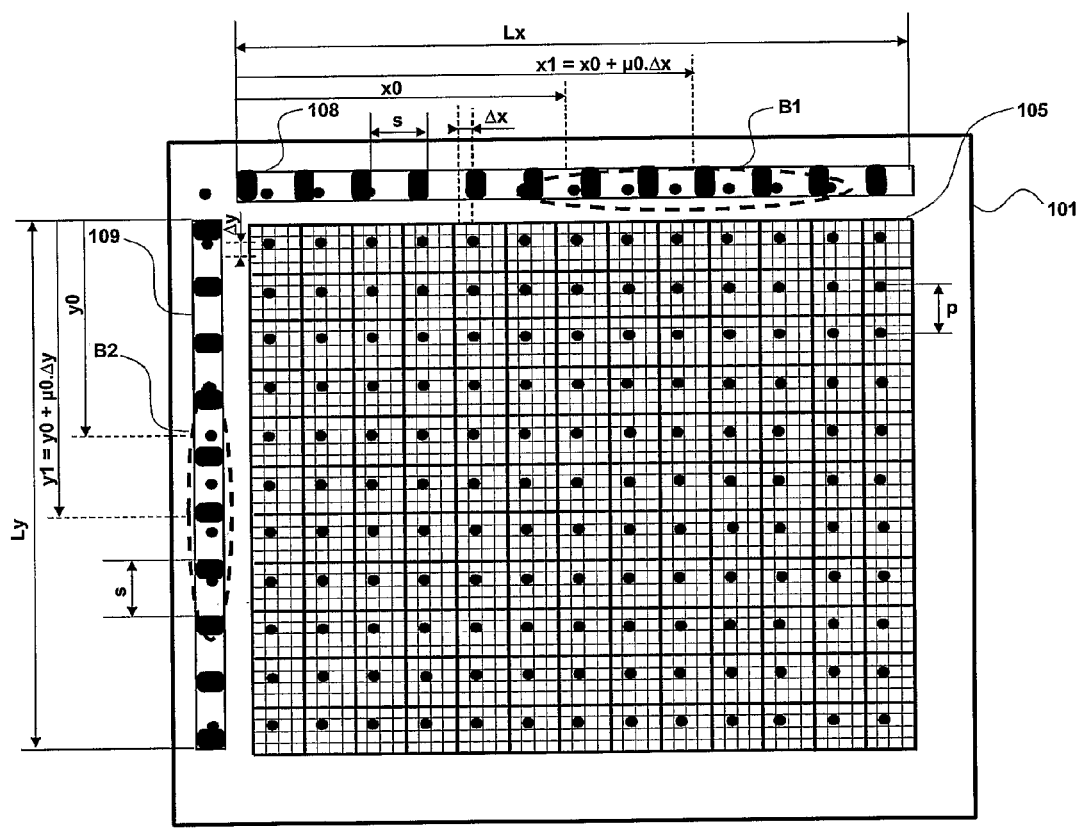
FIG. 11 illustrates by a second example said first information carrier according to the invention.

FIGS. 10 and 11 illustrates the generation of moiré patterns. They show the information carrier 101 on which is applied the array of light spots 103 having a period referred to as "p" in both directions. The light spots are not only applied on each macro-cell of the data area 105, but also on the periodic structures 108 and 109. The period p equals the side of the macro-cells. Because of the difference between the period p and the period s of the structures 108 and 109, the first periodic structure 108 and the second periodic structure 109 are magnified, and detected on the detection area 110 and 111, respectively. In this example, s and p are chosen so that the ratio s/p=11/10, leading to a magnification factor μ0=10.

FIG. 10 represents an initial position of the scanning of the information carrier in which each light spot is to be positioned in the upper left corner of each macro-cell. The first periodic structure 108 is magnified, and the corresponding first moiré pattern comprises a first light blob B1. The first light blob B1 corresponds to the magnification of the transparent stripes located between two adjacent non-transparent stripes of the periodic structure 108. The second periodic structure 109 is also magnified, and the corresponding second moiré pattern comprises a second light blob B2. The second light blob B2 corresponds to the magnification of the transparent stripes located between two adjacent non-transparent stripes of the periodic structure 109.

To accurately position each light spot in the upper left corner of each macro-cell, the array of light spots 103 is moved until the first light blob B1 is positioned at a known distance x0 from the left side of the detection area 110, and until the second light blob B2 is positioned at a known distance y0 from the upper side of the detection area 111. Distance x0 and distance y0 are known from design.

When the array of light spots is moved horizontally for reading a next set of elementary data areas, the first light blob b1 is moved horizontally. When the array of light spots is moved vertically for reading a next set of elementary data areas, the second light blob B2 is moved vertically.

For scanning purposes, considering that the array of light spots 103 is to be moved horizontally to the right by an amount k1.Δx, and is to be moved vertically to the bottom by an amount k2.Δy, where Δx corresponds to the distance between two horizontal adjacent elementary data areas, where Δy corresponds to the distance between two vertical adjacent elementary data areas, where k1 is an integer verifying 1≦k1≦k1_max (k1=1 in this example), where k1_max corresponds to the number of elementary horizontal shifts necessary for horizontally scanning a macro-cell (k1_max=3 in this example), k2 is an integer verifying 1≦k2≦k2_max (k2=1 in this example), where k2_max corresponds to the number of elementary vertical shifts necessary for vertically scanning a macro-cell (k2_max=3 in this example), the targeted position of the light spots is reached when the following conditions are fulfilled:

the position of the first light blob B1 is detected at a distance x1=(x0+μ0.k1.Δx) from the left side of the detection area 110, and the position of the second light blob B2 is detected at a distance y1=(y0+μ0.k2.Δy) from the upper side of the detection area 111.

To facilitate the location of the light blobs on the detection areas, it is advantageous to generate only one light blob along the length L (L=Lx, or L=Ly) of a given detection area. It can be shown that for having one light blob, the periods s and p have to verify the following relation:

$$|p - s| = \frac{p^2}{L} \quad (4)$$

The periods s and p are also chosen so that the distances x1=(x0+μ0.k1_max.Δx) and y1=(y0+μ0.k2_max.Δy) do not exceed Lx and Ly, respectively.

Advantageously, the width of the periodic structures 108 and 109 is at least as large as the period p of the array of light spots 103 so that when the array of light spots is scanned over the information carrier 101, there is always a subset of light spots that may interfere with the periodic structures for creating moiré patterns.

Figure 12:
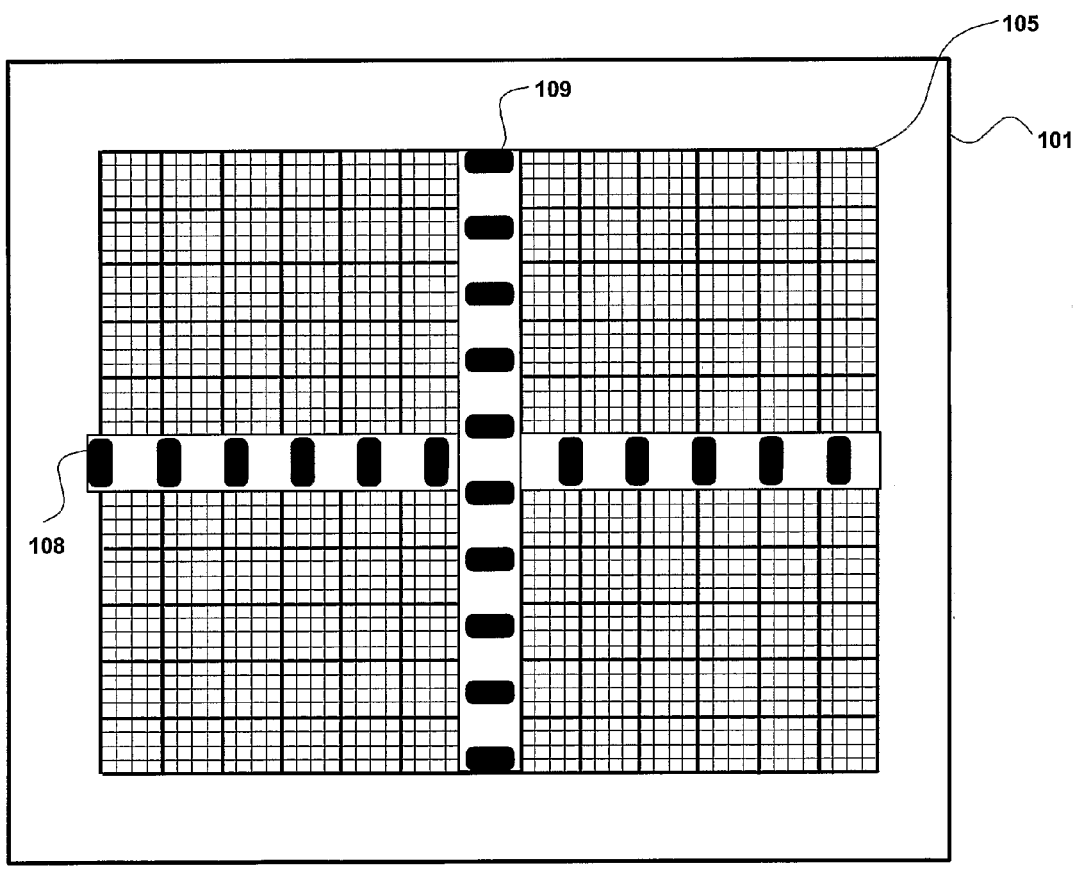
FIG. 12 depicts a second information carrier according to the invention.

Alternatively, as depicted in FIG. 12, the first and second periodic structures 108 and 109 are arranged according to a cross inside the data area 105. The corresponding detection areas 110 and 111 are also arranged according to a cross inside the detection area 107.

Figure 13:
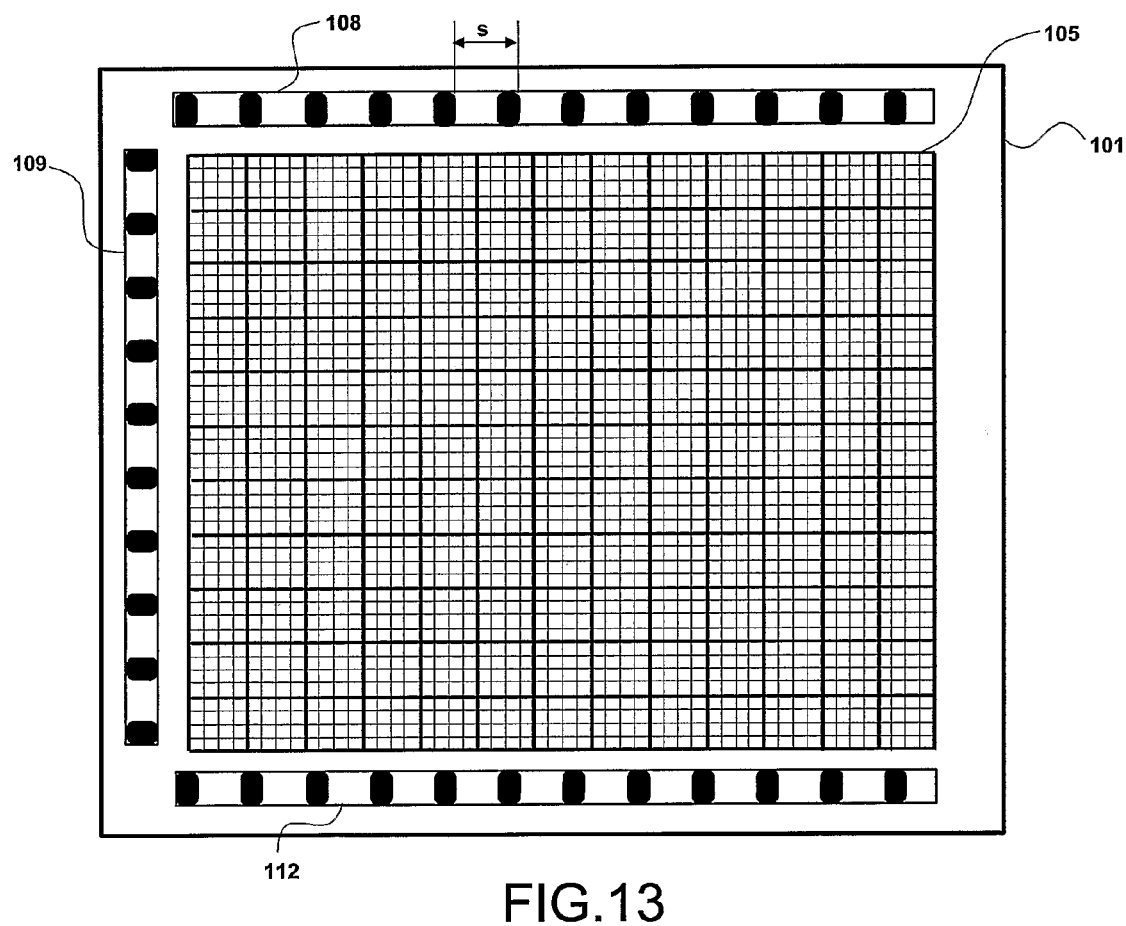
FIG. 13 depicts a third information carrier according to the invention.

FIG. 13 depicts a top view of an information carrier 101 having the same characteristics as the information carrier depicted in FIG. 9, but additionally comprising a third periodic structure 112 intended to interfere with said periodic array of light spots for generating a third moiré pattern on a detection area 113 of the detector 106. The third periodic structure 112 is identical with the first periodic structure 108, is placed on the periphery of said data area 105, and is arranged parallel and opposite to said first periodic structure 108.

The first moiré pattern and the third moiré pattern are intended to give information on an angular misalignment between the periodic array of light spots 103 and the information carrier 101.

Since one light spot has to be applied on the same elementary data area in each macro-cell, the detection and correction of angular misalignment is an important issue to be handled before performing a read or write operation on the data area.

Figure 14:
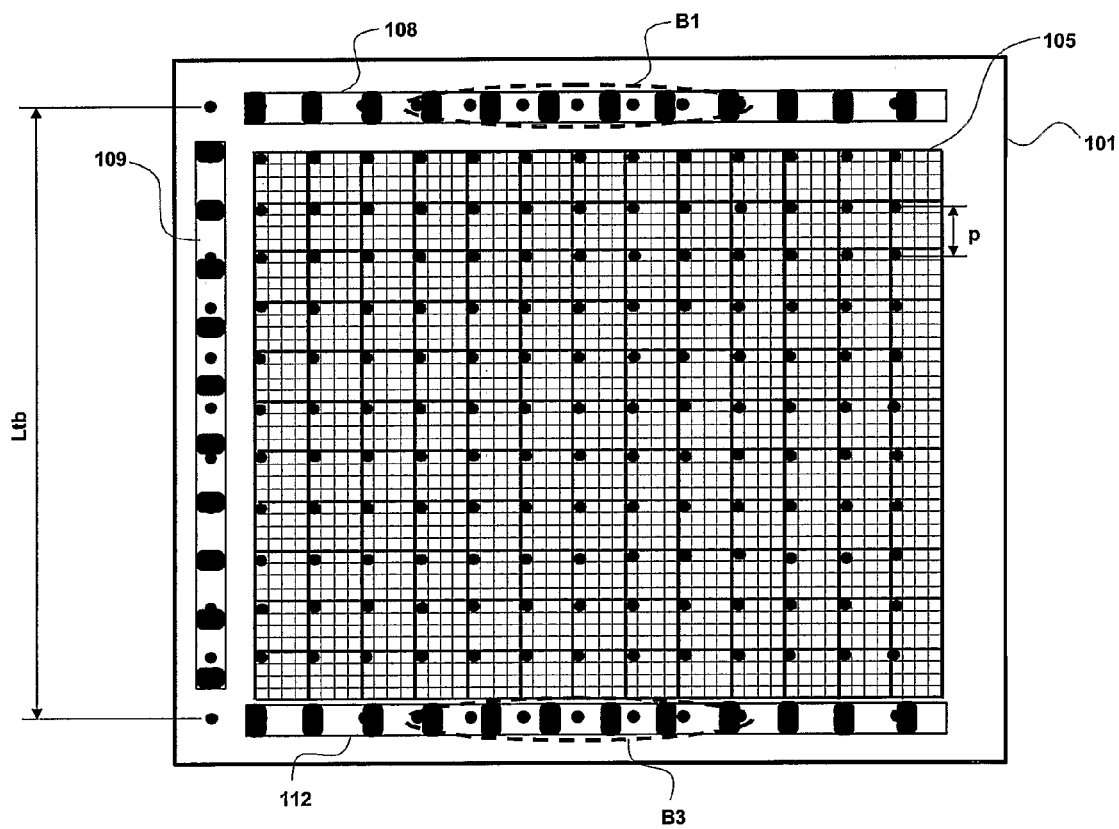
FIG. 14 illustrates by a first example said third information carrier according to the invention.

As illustrated by FIG. 14, when there is no misalignment between the array of light spots and the information carrier 101, the first moiré pattern comprises a first light blob B1, and the third moiré pattern comprises a third light blob B3. The light blobs B1 and B3 are vertically aligned.

Figure 15:
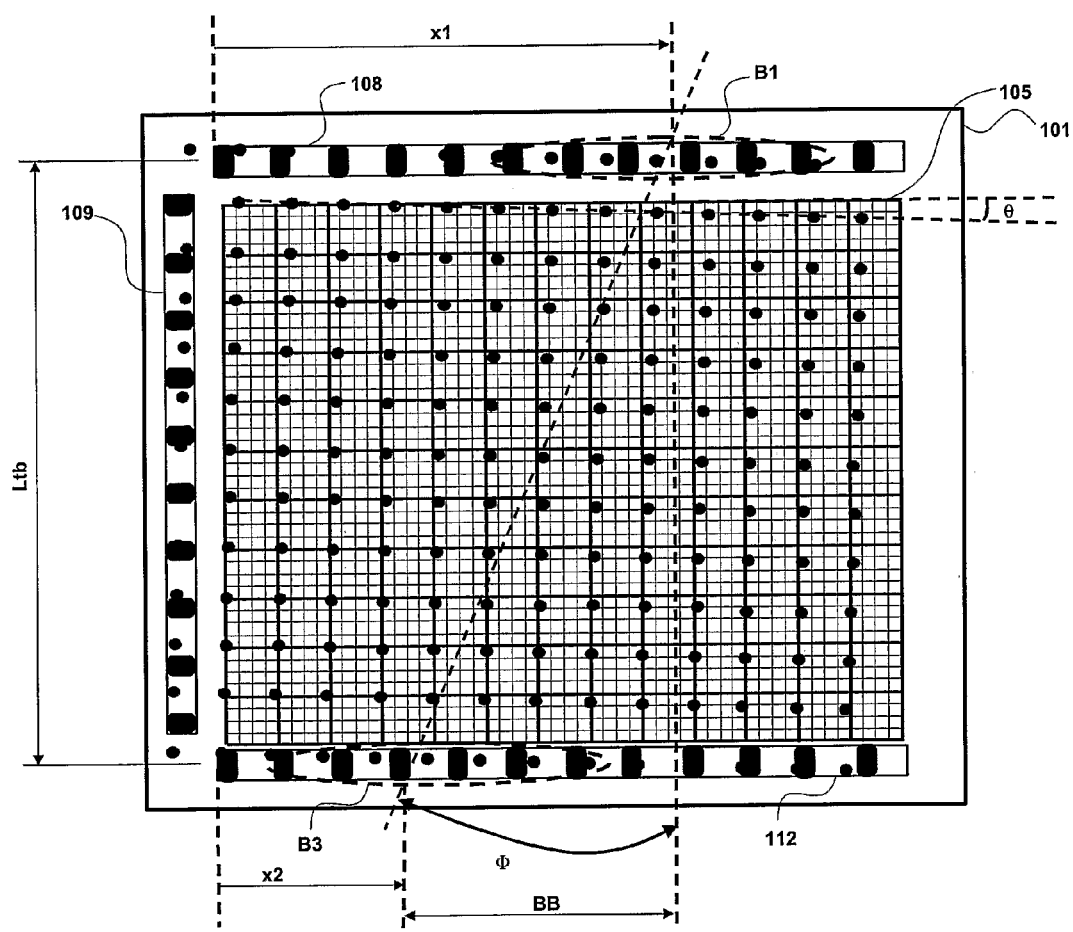
FIG. 15 illustrates by a second example said third information carrier according to the invention.

As illustrated by FIG. 15, when a misalignment between the array of light spots and the information carrier 101 occurs (2 degrees in this example), the first light blob B1 is shifted horizontally, and the third light blob B3 is also shifted horizontally. If the center of rotation is in between 108 and 112 (as illustrated by FIG. 15), the light blobs B1 and B3 are shifted horizontally in an opposite direction. On the contrary, if the center of rotation is beyond 108 and 112, the light blobs B1 and B3 are shifted horizontally in the same direction but in unequal amounts.

From (2), if the misalignment angle θ is small (i.e. not larger than a few degrees), it can be shown that the misalignment angle θ may be derived from the following relation:

$$\theta = \frac{BB}{\mu \cdot Ltb} \quad (5)$$

where Ltb is the vertical distance between the first periodic structure 108 and the second periodic structure 109, BB is the vertical shift between the first light blob B1 and the second light blob B2, μ is the magnification factor as defined by (3).

The sign of angle θ is given by the sign of the difference (x1−x2), where x1 is the position of the first light blob B1 measured from the left side of the detection area 110, and where x2 is the position of the third light blob B3 measured from the left side of the detection area 112.

To perform the correction of the angular misalignment, the system of FIG. 1 comprises actuation means AC3-AC4-AC5 (e.g. piezoelectric actuators) for adjusting the angular position of said information carrier 101 with respect to said array of light spots 103. They are controlled by control signals 123 derived from said angle θ.

In a first embodiment depicted in FIG. 1, the actuation means AC3-AC4-AC5 are in contact with the periphery of the information carrier 101. In this case, the array of light spots 103 is fixed, while the information carrier 101 may rotate under the control of said actuation means, until the angular misalignment is canceled.

Alternatively, in a second embodiment (not depicted), the actuation means AC3-AC4-AC5 are in contact with the periphery of the optical element 102 generating the array of light spots 103. In this case, the information carrier 101 is fixed, while the array of light spots 103 may rotate under the control of said actuation means, until the angular misalignment is canceled.

The use of three actuators AC3-AC4-AC5 is sufficient for rotating the information carrier 101 (or the optical element 102) around the vertical axis z, so as to correct the angular misalignment θ.

Figure 16:
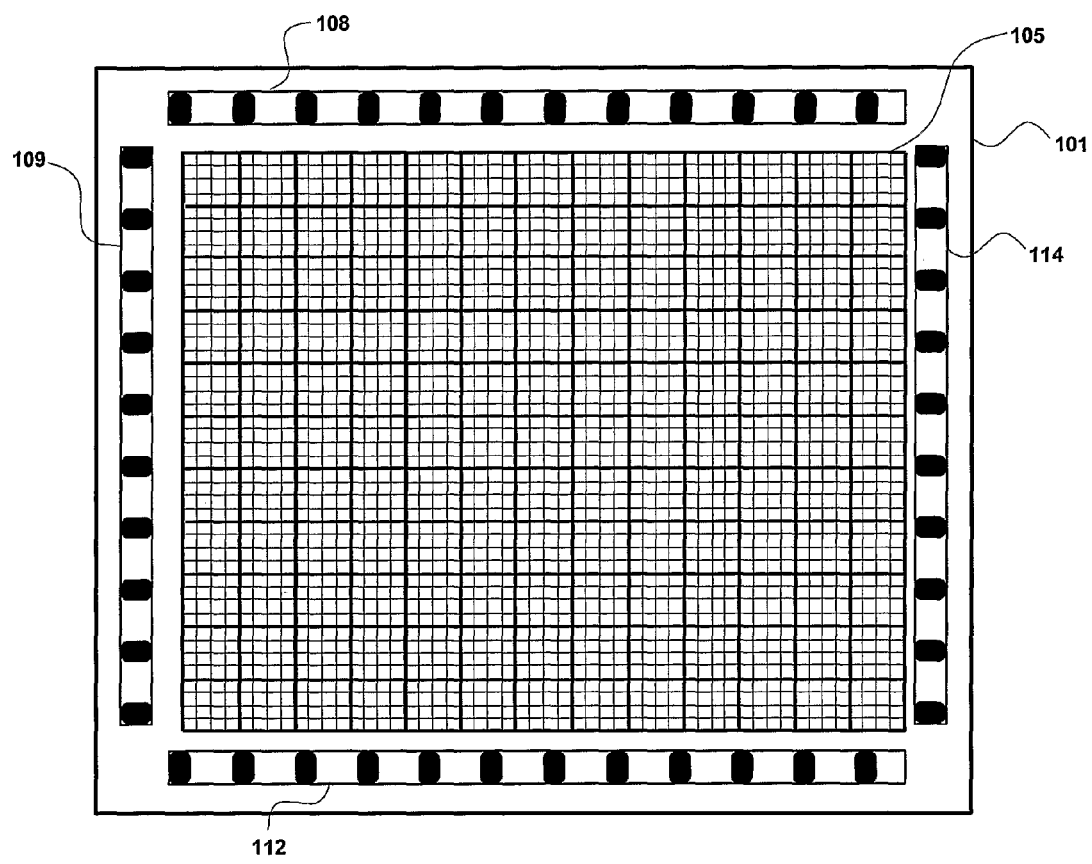
FIG. 16 depicts a fourth information carrier according to the invention.

FIG. 16 depicts a top-view of an information carrier 101 having the same characteristics as the information carrier depicted in FIG. 13, but additionally comprising a fourth periodic structure 114 intended to interfere with said periodic array of light spots for generating a fourth moiré pattern on a detection area 115 of the detector 106. Similarly to the second moiré pattern, the fourth moiré pattern comprises a fourth light blob B4 (not illustrated).

The fourth periodic structure 109 is identical with said second periodic structure 109, placed on the periphery of the data area 105, and arranged parallel and opposite to said second periodic structure 109.

The fourth moiré pattern may be used for improving the robustness in the measurement of the angular misalignment. Indeed, a first measure of the misalignment angle θmay be derived from said first and third moiré pattern in using relation (5) as explained previously, and a second measure of the misalignment angle may be derived from said second and fourth moiré pattern similarly. The average of these two intermediate measures is performed to derive a measure of the misalignment angle θ.

It is noted that the third moiré pattern, similarly to the first moiré pattern, may also be used for measuring the horizontal shift between the array of light spots and the information carrier.

It is noted that the fourth moiré pattern, similarly to the second moiré pattern, may also be used for measuring the vertical shift between the array of light spots and the information carrier.

Figure 17:
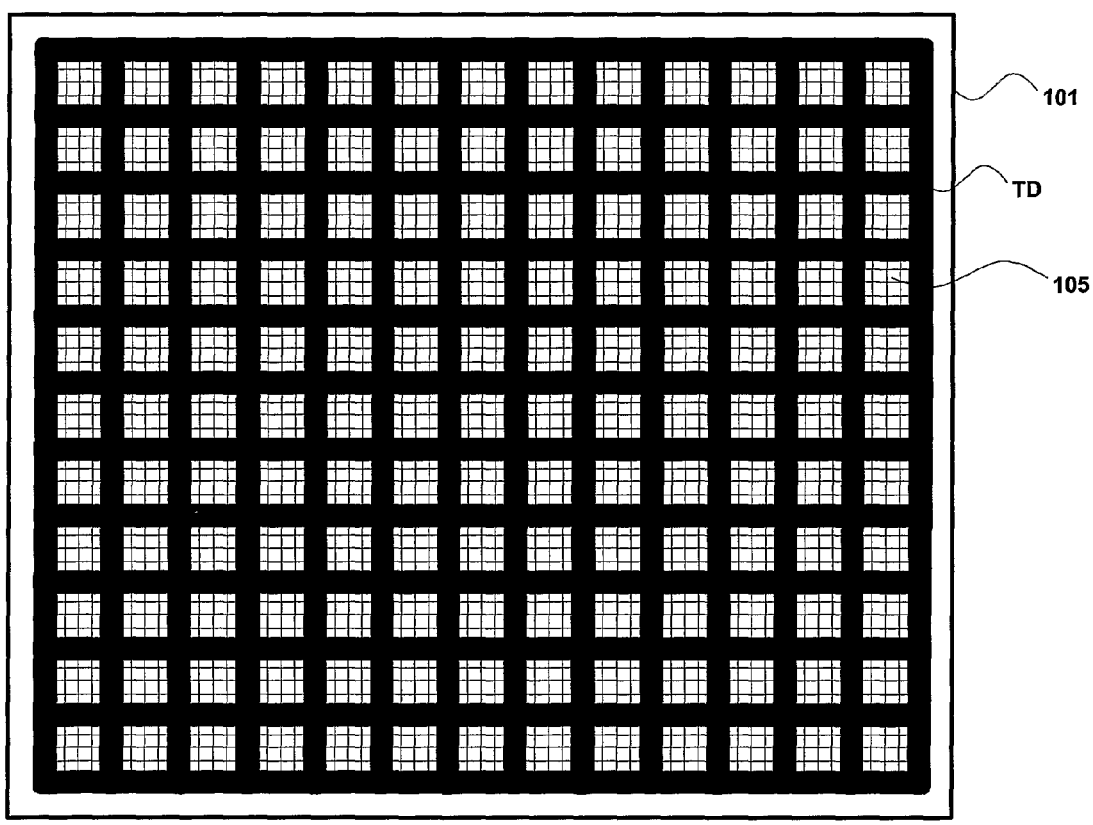
FIG. 17 depicts a fifth information carrier according to the invention.

FIG. 17 depicts a top view of an information carrier 101 intended to be read and/or written by the periodic array of light spots 103.

The information carrier 101 comprises a data area 105 defined by a set of elementary data areas, and organized in macro-cells as previously described.

The information carrier 101 also comprises a two-dimensional periodic structure TD intended to interfere with the periodic array of light spots for generating a global moiré pattern on the detection area 107 of the detector 106. This two-dimensional periodic structure is intermingled with said elementary data areas. The global moiré pattern to be detected on the detection area 107 is thus also intermingled with the data. However, since the data are a priori random, a periodic pattern may easily be detected in the detection area 107, for example in using known matching algorithms.

Figure 18:
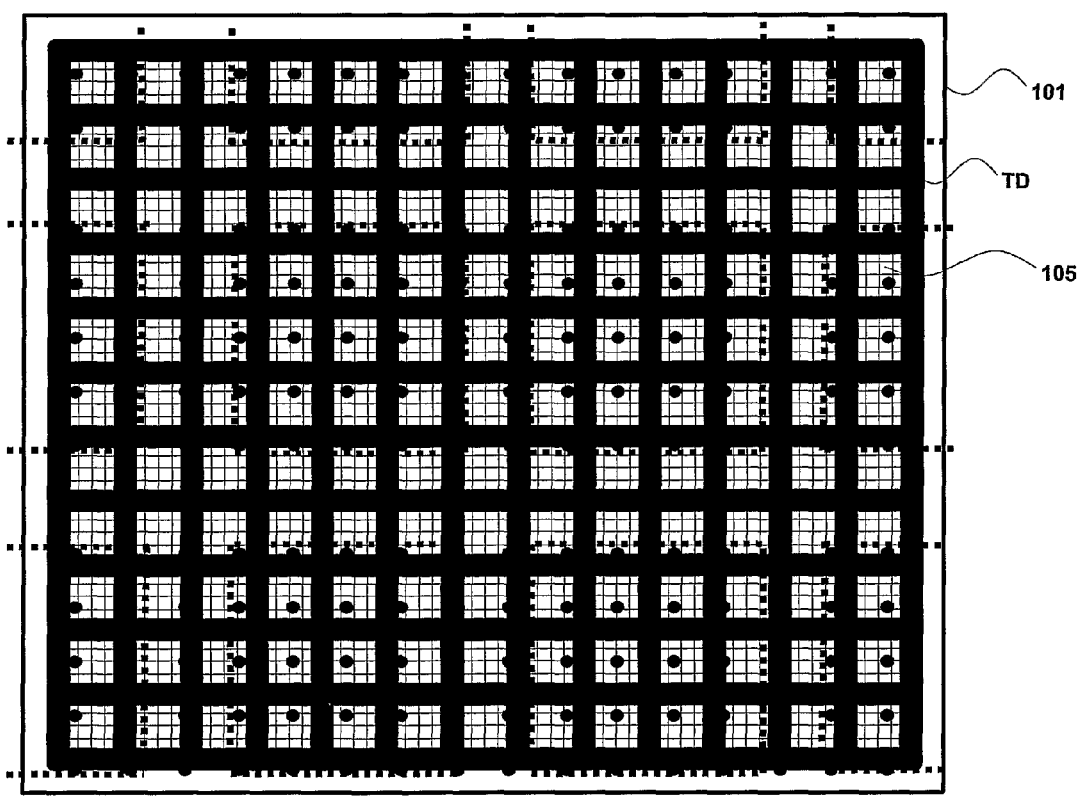
FIG. 18 illustrates by a first example said fifth information carrier according to the invention.

As illustrated in FIG. 17, the two-dimensional periodic structure TD defines a grid formed by vertical and parallel stripes (having a width twice larger than the size of an elementary data area in this example), and by horizontal and parallel stripes (having a width twice larger than the size of an elementary data area in this example). As illustrated by FIG. 18, the corresponding moiré pattern is also a grid which is magnified (represented also with squares in dotted lines to simplify the understanding).

The horizontal position of the magnified grid may be used for determining the horizontal position between the information carrier and the array of light spots, while the vertical position of the magnified grid may be used for determining the vertical position between the information carrier and the array of light spots, similarly to the tracking of light blobs B1 and B2 described previously.

In case of an angular misalignment between the information carrier and the array of light spots, the moiré pattern is also rotated according to (2).

Figure 19:
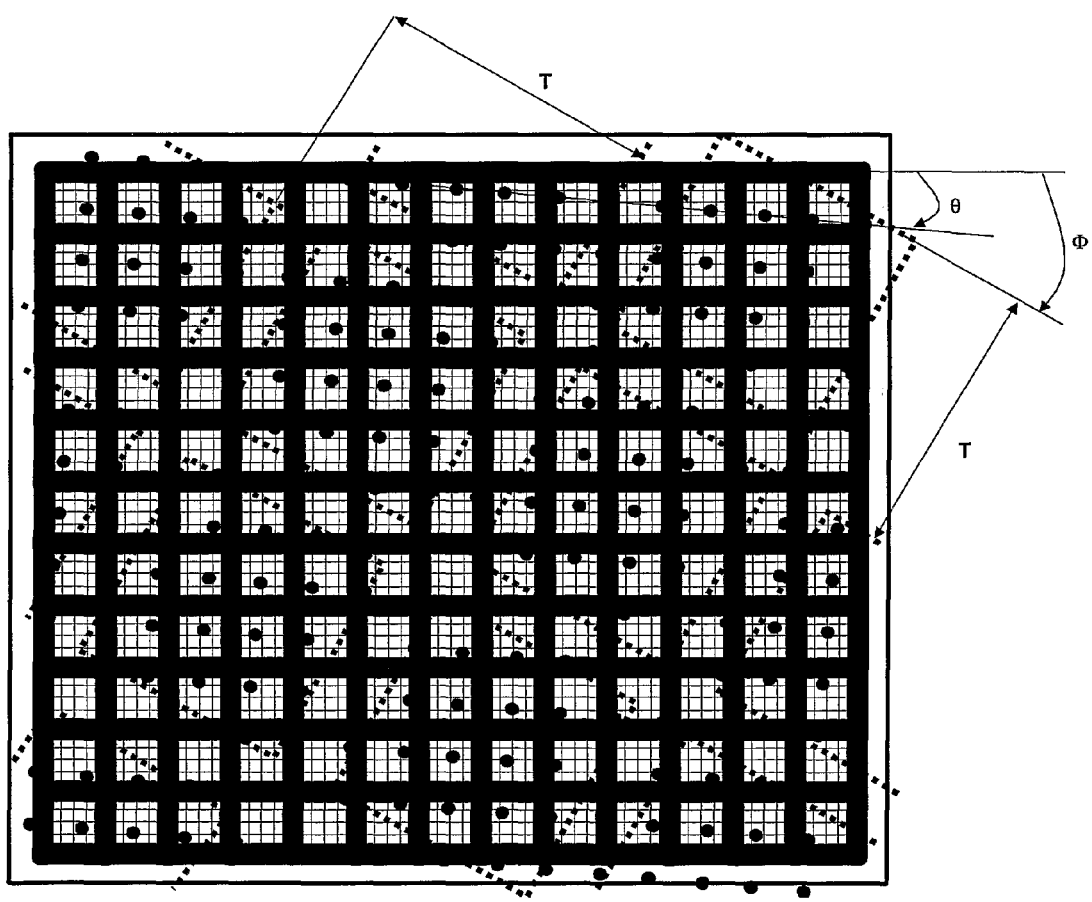
FIG. 19 illustrates by a second example said fifth information carrier according to the invention.

FIG. 19 illustrates the case with a misalignment θ of 5 degrees. It can be shown from (2) that the angular misalignment θ may be derived from the following relation:

$$\tan\theta = \frac{p\sin\phi}{p\cos\phi + T} \quad (6)$$

where T is the period of the global moiré pattern detected on the detection area 107.

Coming back to FIG. 1, the system also comprises a processing unit 116 intended to perform calculations from the different moiré patterns detected and generated by the detector 106, and carried as signals via a data bus 117. The processing can be done by code instructions stored in a memory and executed by a signal processor. In particular, the processing unit 113 comprises:

first analysis means 118 for deriving from said first and second moiré patterns the spatial position (x,y) between the periodic array of light spots 103 and said information carrier 101. Analysis means 118 control the detection of the position of the light blobs B1 and B2 along the detection areas 110 and 111 respectively. To this end, known tracking algorithms may be used.

second analysis means 119 for deriving from said first and third moiré patterns and/or from said second and fourth moiré patterns the angle value θ between said periodic array of light spots 103 and said information carrier 101. Analysis means 119 control the detection of the position of the light blobs B1, B2, B3 and B4 along the detection areas 110, 111, 113 and 115, respectively (in using for example known tracking algorithms), and the deriving of the angle value θ from relation (5).

From (2), the period of the periodic structures 108, 109, 112 or 114 may be derived from the relation:

$$s = p\cos\theta - \frac{p\sin\theta}{\tan\phi} \quad (7)$$

If the misalignment angle θ is accurately known, for example from relation (6), relation (7) allows to derive a measure of the period s of the periodic structure considered.

The processing unit 116 thus comprises third analysis means 120 for deriving from (7) a measure of the period s of said first, second, third or fourth periodic structure (108, 109, 112, 114), from the period p of said periodic array of light spots 103, the angle value θ and the measured angle φ between said first, second, third or fourth periodic structure (108, 109, 112, 114) and said first, second, third or fourth moiré pattern.

If the measured period s is different from a targeted and known period s0, for example because of a temperature change, it may be assumed that a shift will occur between the light spots and the macro-cells. The measure of the period s is thus advantageously used for controlling the size of the macro-cells with respect to the period p of the light spots, in varying the size of the information carrier 101.

Figure 20:
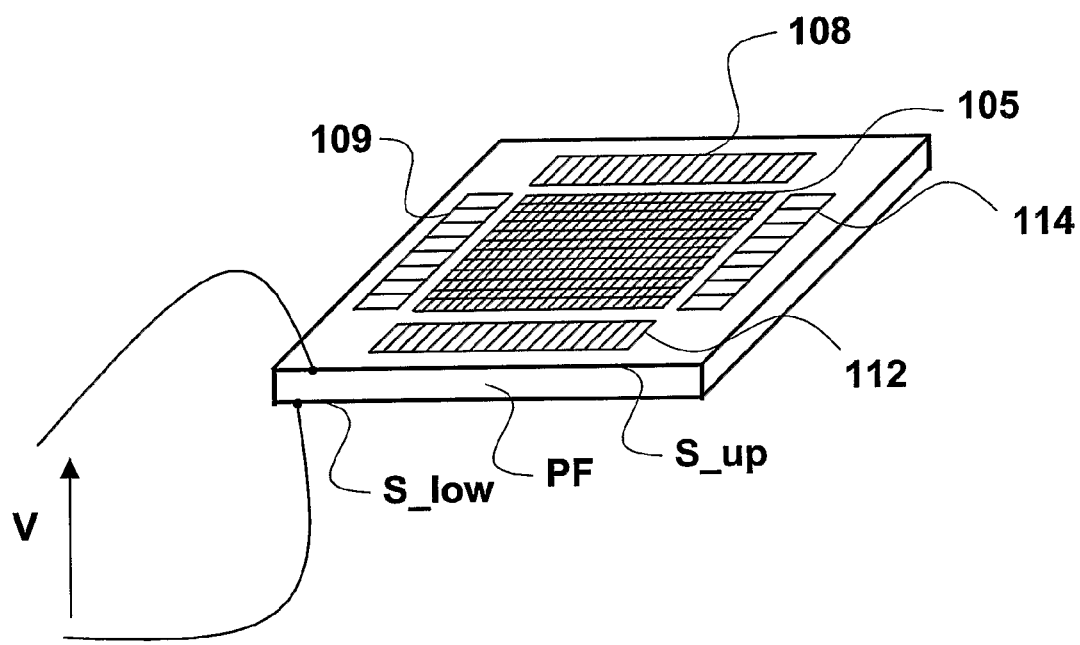
FIG. 20 depicts a sixth information carrier according to the invention.

To this end, as illustrated in FIG. 20, the information carrier 101 comprises a transparent layer (PF) made of a polymer film comprising an upper surface S_up and a lower surface S_low. The polymer film is intended to receive a voltage difference V between the two surfaces. When the voltage difference V is applied between the two surfaces, the Maxwell stress phenomenon causes the polymer film to lengthen in planar direction, varying the period s of the periodic structures.

The voltage difference V is a signal generated by a loop control and derived from a difference between the targeted period s0 and the measured period s.

As a consequence, the polymer film acts as third actuation means for adjusting the period s of said first, second, third or fourth periodic structure 108-109-112-114, based on control signals derived from the measure of said period s.

In the previous sections, it was assumed that the quality of the light spots applied to the information carrier 101 was well focused (i.e. small light spots having a high contrast) such that the array of light spots 103 is equivalent to a sampling operation. In practice, it may occur that the light spots are not perfectly focused, to the detriment of the data reading in the data area 105. It is thus an important issue to measure the focus and to vary accordingly along axis z the distance between the information carrier 101 and the optical element 102 generating the array of light spots 102.

The moiré magnification can be considered to be a convolution of a magnification of the periodic structure with a magnification of the array of light spots itself. As a consequence, when the light spots are well focused, the different moiré patterns have a blurred appearance. On the contrary, when the light spots are well focused, the different moiré patterns have a sharp appearance.

It is thus proposed to control the focus of the light spots by first analysing the sharpness of the moiré patterns detected on the detector 106, then varying along axis z the distance between the information carrier 101 and the optical element 102, until a maximum contrast in one or a plurality of moiré patterns is measured.

The contrast of the moiré patterns can be established with an algorithm based on a gradient measure, or alternatively, with an algorithm based on a histogram. To this end, the processing unit 116 comprises fourth analysis means 121 for deriving a contrast value of at least one of said first, second, third or fourth moiré pattern.

The distance between the information carrier 101 and the optical element 102 is varied by third actuation means AC6 (e.g. a piezoelectric actuator).

Figure 21:
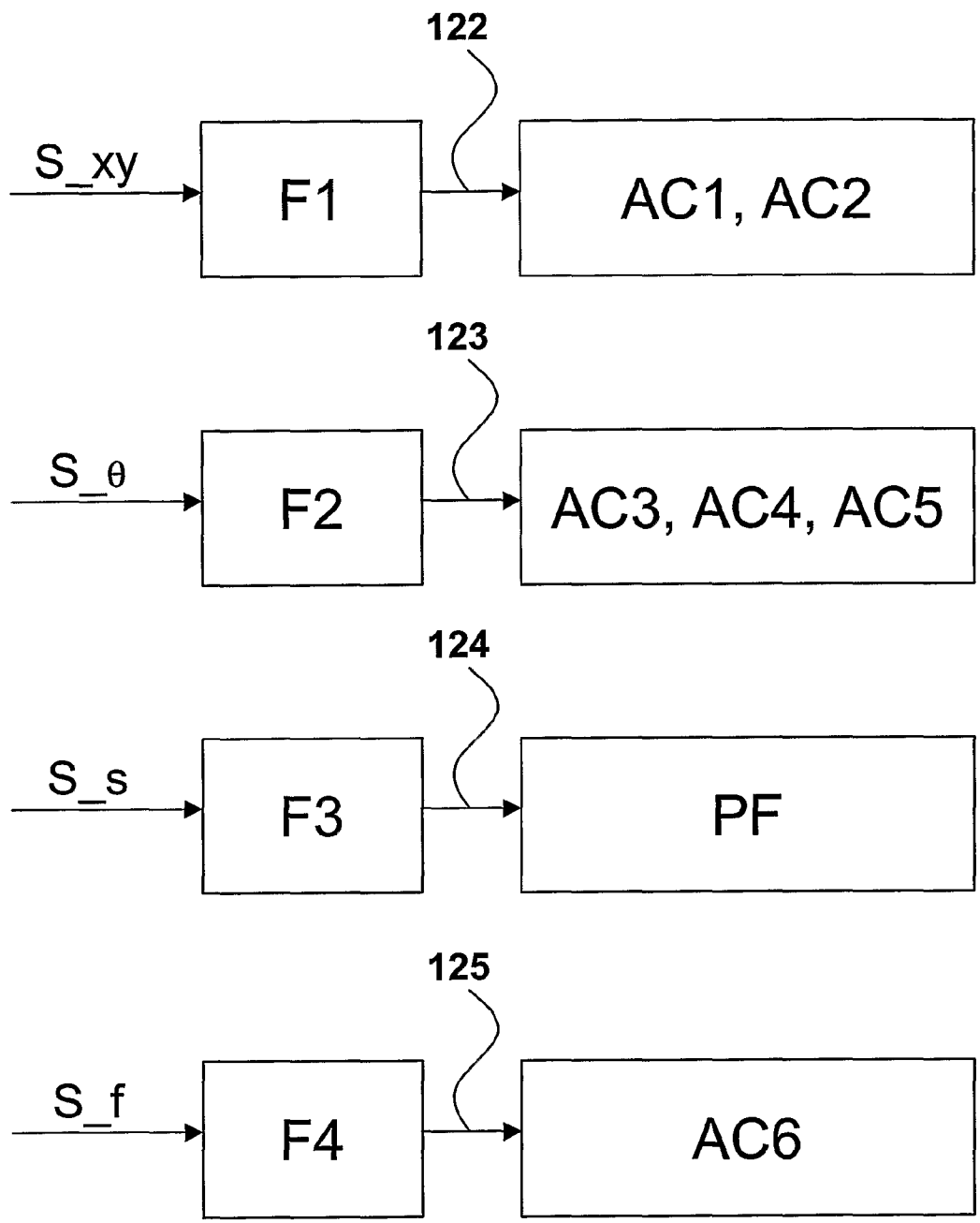
FIG. 21 depicts the control loops according to the invention.

FIG. 21 depicts the principle of the loop controls performed by the processing unit 116 for controlling the system depicted in FIG. 1.

For adjusting the spatial position (x, y) of the information carrier 101 with respect to the array of light spots 103, a signal S_xy reflecting the spatial position (x, y) is passed through a first low-pass filter F1 intended to generate control signals 122 generated by the processing unit 116 to the actuation means AC1-AC2. In response, the actuation means AC1-AC2 correct their spatial position. The optimal position between the information carrier and the array of light spots is reached when the measured spatial position corresponds to a targeted spatial position.

For adjusting the angular position θ of the information carrier 101 with respect to the array of light spots 103, a signal S_θ reflecting the value of angle θ is passed through a second low-pass filter F2 intended to generate control signals 123 generated by the processing unit 116 to the actuation means AC1-AC2-AC3. In response, the actuation means AC1-AC2-AC3 correct their angular position, which modifies the measured angle θ. The optimal alignment between the information carrier and the array of light spots is reached when angle θ tends toward zero.

For adjusting the period s of the structures printed on the information carrier 101, a signal S_s reflecting the value of said period s is passed through a third low-pass filter F3 intended to generate control signals 124 generated by the processing unit 116 to the actuation means PF. In response, the actuation means PF elongate, which modifies the: size of the information carrier 101 as well as the measured period s. The optimal period s of the information carrier is reached when it tends toward a targeted period s0.

For adjusting the focus of the array of light spots 103 applied to the information carrier 101, a signal S_f reflecting a measure of the focus is passed through a fourth low-pass filter F4 intended to generate control signals 125 generated by the processing unit 116 to the actuation means AC6. In response, the actuation means AC6 move along axis z the height of the information carrier 101. The optimal focus of the light spots is reached when the contrast of said first, second, third or fourth moiré pattern is maximum.

The system according to the invention can advantageously be implemented in an apparatus for reading and/or writing data on an information carrier as previously described.

Preferably, when the invention is implemented in such an apparatus, the focus of the light spots is first measured and corrected, then the misalignment angle between the array of light spots and the information carrier is measured and corrected. These two steps have to be done prior to a read or write operation of the data area. Then, the spatial position measurement and adjustment can be performed during read or write operations.

Use of the verb "to comprise" and its conjugations does not exclude the presence of elements or steps other than those stated in the claims. Use of the article "a" or "an" preceding an element or step does not exclude the presence of a plurality of such elements or steps.

The invention claimed is:

1. System comprising:
   an optical element (102) for generating a periodic array of light spots (103) intended to be applied to an information carrier (101),
      said information carrier (101) comprising a first periodic structure (108) being intended to interfere with said periodic array of light spots (103) for generating a first moiré pattern, and a second periodic structure (109) being intended to interfere with said periodic array of light spots (103) for generating a second moiré pattern, said second periodic structure (109) being placed perpendicularly to said first periodic structure (108),
   first analysis means (118) for deriving from said first and second moiré patterns, the spatial position (x,y) between said periodic array of light spots (103) and said information carrier (101),
   first actuation means (AC1-AC2) for adjusting the spatial position of said information carrier (101) with respect to said array of light spots (103), based on control signals (122) derived from said spatial position (x,y).

2. System as claimed in claim 1, wherein said information carrier also comprises a third periodic structure (112) intended to interfere with said periodic array of light spots (103) for generating a third moiré pattern, said third periodic structure (112) being placed parallel and opposite to said first periodic structure (108), said system also comprising
   second analysis means (119) for deriving from said first and third moiré patterns, the angle value ($\theta$) between said periodic array of light spots (103) and said information carrier (101),
   second actuation means (AC3-AC4-AC5) for adjusting the angular position of said information carrier (101) with respect to said array of light spots (103), based on control signals (123) derived from said angle value ($\theta$).

3. System as claimed in claim 1, wherein said information carrier also comprises a third periodic structure (112) intended to interfere with said periodic array of light spots (103) for generating a third moiré pattern, and a fourth periodic structure (114) intended to interfere with said periodic array of light spots (103) for generating a fourth moiré pattern, said third periodic structure (112) being placed parallel and opposite to said first periodic structure (108), and said fourth periodic structure (114) being placed parallel and opposite to said second periodic structure (109), said system also comprising:
   second analysis means (119) for deriving from said first and third moiré patterns, and from said second and fourth moiré patterns, the angle value ($\theta$) between said periodic array of light spots (103) and said information carrier (101),
   second actuation means (AC3-AC4-AC5) for adjusting the angular position of said information carrier (101) with respect to said array of light spots (103), based on control signals (123) derived from said angle value ($\theta$).

4. System as claimed in claim 1, also comprising:
   fourth analysis means (121) for deriving a contrast value of at least one of said first, second, third or fourth moiré pattern,
   fourth actuation means (AC6) for adjusting the distance between said information carrier (101) and said array of light spots (103), based on control signals (125) derived from said contrast value.

5. Apparatus for reading and/or writing data on an information carrier, said apparatus comprising a system as claimed in claim 1.

6. System as claimed in claim 2, also comprising:
   third analysis means (120) for deriving a measure of the period(s) of said first, second, third or fourth periodic structure (108, 109, 112, 114), from the period (p) of said periodic array of light spots (103), said angle value ($\theta$), and the angle ($\phi$) between said first, second, third or fourth periodic structure (108, 109, 112, 114), and said first, second, third or fourth moiré pattern,
   third actuation means (PF) for adjusting the period of said first, second, third or fourth periodic structure (108, 109, 112, 114), based on control signals (124) derived from the measure of said period(s).

7. Information carrier (101) intended to be read and/or written by a periodic array of light spots, said information carrier (101) comprising:
   a data area (105) defined by a set of elementary data areas,
   a first periodic structure (108) intended to interfere with said periodic array of light spots for generating a first moiré pattern,
   a second periodic structure (109) intended to interfere with said periodic array of light spots for generating a second moiré pattern, said second periodic structure (109) being arranged perpendicularly to said first periodic structure (108).

8. Information carrier as claimed in claim 7, wherein said first and second periodic structures (108, 109) are placed on the periphery of said data area (105), or arranged according to a cross inside said data area (105).

9. Information carrier as claimed in claim 7, further comprising a transparent layer (PF) made of a polymer film, the size of said transparent layer (PF) being controllable by a voltage (V).

10. Information carrier (101) intended to be read and/or written by a periodic array of light spots, said information carrier (101) comprising:
    a data area (105) defined by a set of elementary data areas,
    a first periodic structure (108) intended to interfere with said periodic array of light spots for generating a first moiré pattern, said first periodic structure (108) being placed on the periphery of said data area (105),
    a second periodic structure (109) intended to interfere with said periodic array of light spots for generating a second moiré pattern, said second periodic structure (109) being placed on the periphery of said data area (105) and arranged perpendicularly to said first periodic structure (108),
    a third periodic structure (112) intended to interfere with said periodic array of light spots for generating a third moiré pattern, said third periodic structure (112) being identical with said first periodic structure (108), placed on the periphery of said data area (105) and arranged parallel and opposite to said first periodic structure (108).

11. Information carrier as claimed in claim 10, further comprising a fourth periodic structure (114) intended to interfere with said periodic array of light spots for generating a fourth moiré pattern, said fourth periodic structure (114) being identical with said second periodic structure (109), placed on the periphery of said data area (105) and arranged parallel and opposite to said second periodic structure (109).

12. Information carrier (101) intended to be read and/or written by a periodic array of light spots, said information carrier (101) comprising:

a data area (105) defined by a set of elementary data areas, a two-dimensional periodic structure (TD) intended to interfere with said periodic array of light spots for generating a moiré pattern, said two-dimensional periodic structure (TD) being intermingled with said elementary data areas.

13. Information carrier as claimed in claim 12, wherein said two-dimensional periodic structure (TD) defines a grid.

\* \* \* \* \*